July 1, 1969 — G. HARFF ET AL — 3,452,736

BARBECUE GRILLS

Filed Feb. 8, 1968

INVENTORS
Gunter Harff and
Leonard A. Grossman
BY S. Stephen Baker
ATTORNEY

3,452,736
BARBECUE GRILLS
Gunter Harff, 110—05 68th Ave., Forest Hills, N.Y. 11375, and Leonard A. Grossman, 28 Lafayette Drive, Woodmere, N.Y. 11598
Filed Feb. 8, 1968, Ser. No. 704,051
Int. Cl. F24b 3/00; F24c 1/16, 15/08
U.S. Cl. 126—25                                  9 Claims

ABSTRACT OF THE DISCLOSURE

A barbecue grill having intersecured and collapsible legs which may be collapsed to a nested condition or diverged to a barbecue bowl supporting condition, bowl holding wire members pivotally connected at the upper end of each leg for removably engaging and holding the bowl in cooking position and being manually withdrawable therefrom for dis-assembling said grill, said wire members having bow formations resiliently urging end projections of said wire members into openings formed in the bowl so as to eliminate the need for nuts and bolts in assembling and dis-assembling the grill, a transparent glass inverted upper bowl or cover resting on the first-named bowl and being restrained against accidental falling therefrom by said bow formations, and said wire member end projections further functioning as supporting rests for a grid within said first-named bowl.

---

This invention relates to barbecue grills or cookers, particularly of the outdoor type.

The principal object of this invention is to provide such a barbecue grill which is of the knock-down type for shipping or storing, the degree of knock-down being extreme to best achieve this objective, the device requiring neither bolts or nuts for this action, and the construction of the device further achieving a number of other important advances. For example, we provide adjustable wire bowl holding members of a spring nature and which not only maintain the bowl in position, but which also support the inner grid, and further effectively lock the device supporting legs in operating position. Thus, these wire members perform at least a triple function, and in fact have other advantages as will be shown hereinafter. Our device also includes a specially effective leg holder and hinge which cooperates in the knock-down arrangement.

The invention will be further understood from the following description and drawings wherein.

Figure 1:
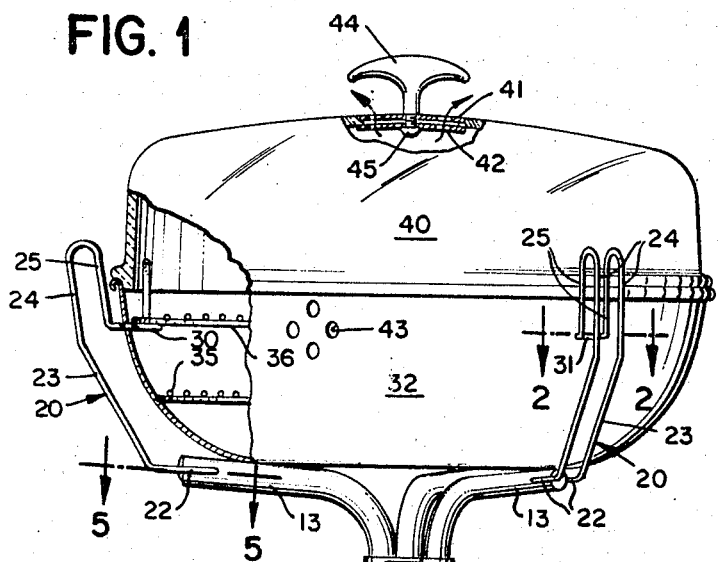
FIGURE 1 is an elevational view, partly broken away, of the article of this invention in the assembled or set-up condition.

Referring to the drawings, there are shown three supporting legs 10 each of which may be considered to be shaped like a U on its side, in that the feet 11 are one side of the U, the standards 12 are the center or bridging sections, and the upper arms 13 are the other side of the U.

Figure 3:
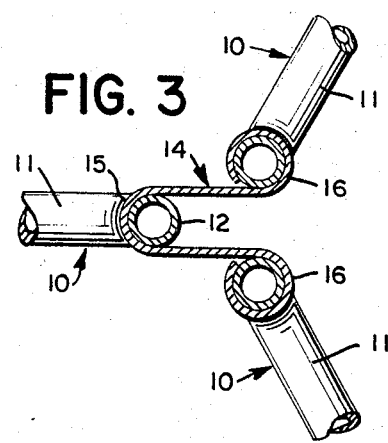
FIGURE 3 is an enlarged fragmentary view as taken along the line 3—3 of FIGURE 1.

The legs 10 are intersecurd by the use of two vertically spaced, upper and lower, metal hinge members 14. Each of the hinge members 14, as best noted in FIGURE 3, is essentially U-shaped with the bridge 15 of the U embracing one standard 12, while the hinge member ends are outwardly curled into rings 16 respectively pivotally embracing the other two standards, all as illustrated in FIGURE 3. In order to maintain the hinge members 14 in position, the bridge 15 may be riveted or welded to its particular standard 12 so that the other legs 10 may be pivoted or swung relative thereto to achieve the folded or knock-down position thereof illustrated in FIGURE 4.

Figure 4:
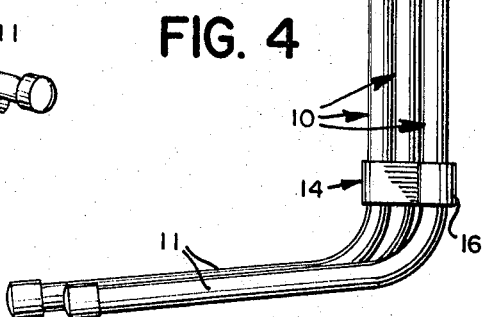
FIGURE 4 is an elevational view of the supporting legs and wire spring members in the knock-down state.

Accordingly, in the knocked-down condition of the legs, they are nested together, as noted in FIGURE 4, while in the operative condition, they unfold to a 120° separation.

The most important aspect of this invention is that of the barbecus bowl holding members 20 which comprise metal rods or wires of about 3/32" diameter. Three such holding members are employed, one for each of the legs 10. Of course the number of legs and holding members 20 may be varied.

Figure 5:
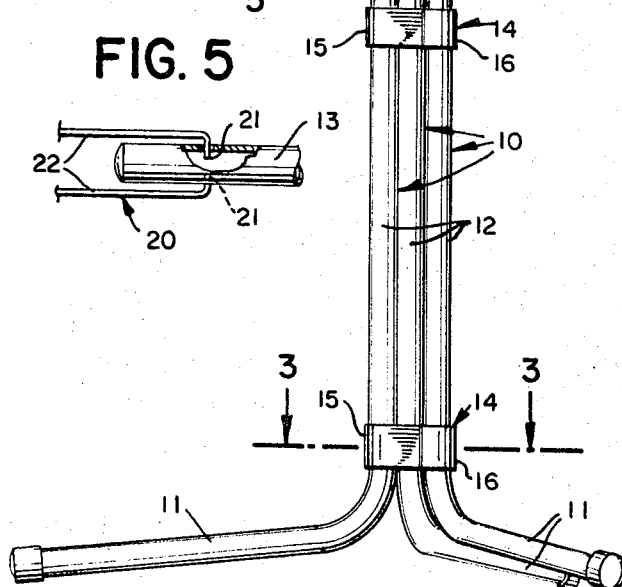
FIGURE 5 is a view taken along the line 5—5 of FIGURE 1.

Each of the wire holding members 20 has opposing free ends 21 which comprise integral short right-angle stubs pivotally respectively received into holes formed adjacent the free ends of the diverging upper arms 13 of the supporting legs 10 as illustrated in FIGURE 5. Continuing from the stub ends 21 are parallel extensions 22 integrally connected to central arms 23, and thence continuing into arms 24, which together with opposing arms 25, comprise a spring bow, as will hereinafter be explained.

Integrally following arms 25 is the end projection or loop 30 which penetrates an opening 31 in barbecue bowl 32, the junction of the arms 25 and loop 30 comprising indentations 33 which resiliently engage the opening 31 to fix the holding members 20 into position. In this connection, it will be noted that barbecue bowl 32 is essentially more or less conventional and formed of metal as is usual. In the set-up condition it rests on upper arms 13. It is firmly held in position when the three loops or end projections 30 engage their respective openings 31 which are 120° apart, the engagement being of a spring nature and easily effected or removed as desired.

Bowl 32 may have the usual charcoal supporting circular grate 35 which simply rests against the bowl wall by reason of its diameter.

Figure 2:
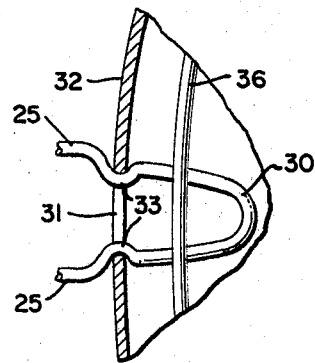
FIGURE 2 is an enlarged fragmentary view as taken along the line 2—2 of FIGURE 1.

A further important function of the loops 30 is to support the inner food grid 36 which is of somewhat larger diameter than grate 35 and which is essentially conventional. Its diameter is slightly less than the diameter of the bowl at its rest position as illustrated in FIGURE 2. Accordingly, it will be recognized that after loops 30 are positioned in openings 31, the food grid 36 may be simply placed over the inwardly extending loops 30 without requiring any other support.

We also provide a cover or upper, inverted bowl 40 which may be of fire resistant transparent glass so as to permit the cooking food to be viewed, the use of cover 40 being of course optional. Bowl 32 and cover 40 may have interfitting lip formations as illustrated in FIGURE 1. Nevertheless, cover 40 might accidentally be shifted in which case the bow formed from arms 24 and 25, extending above the interfitting lips, as illustrated in FIGURE 1, will position the cover 40 against falling.

Cover 40 has a top central opening provided with a disk bushing 41 of metal or of heat resistant fiber or the like with opposed ventilating openings 42 of any desired shape. Openings 42 cooperate with bowl openings 43 in venting the composite enclosure, it having been found that this expedient helps avoid clouding up or misting of the glass cover 40. A heat resistant plastic handle 44 is fixed into bushing 41 as by screw or rivet 45.

When the article is to be disassembled, it is returned to its original packaging and shipping condition by simply removing the cover 40 and food grid 36, manually pulling the loops 30 out of openings 31, removing the bowl 32, and collapsing the legs 10 as above described.

The entire set-up or knock-down is accomplished without requiring screws or the like. The bow-like nature of arms 24 and 25 provides a spring effect because of the pressure of bowl 32 against arm 25, resulting in a secure engagement, the bow formation enhancing the spring action.

It will be recognized that wire members 20 each form two adjacent and parallel vertically extended bows with the loops or end projections 30 disposed at the lower ends of the bows and extending horizontally inwardly to engage the bowl and provide angularly or circumferentially spaced supports or rests for the grid 36, the loops 30 being manually withdrawable therefrom against the action of the resilient bows when the grill is to be dis-assembled.

It is also to be noted that the vertically extending bows formed from arms 24 and 25, in the set-up position, can serve as handles for lifting and moving the barbecue grill about.

We have shown a preferred embodiment of our invention, but it is obvious that numerous changes and omissions may be made therein without departing from its spirit.

What is claimed is:

1. A barbecue grill comprising a bowl, and supporting means therefor, said means comprising a plurality of legs removably connected to said bowl at circumferentially spaced points thereof, supporting feet at the lower ends of said legs, diverging arms at the upper ends of said legs, wire members connected at the outer ends of said arms, said wire members having end projections thereon, and means for removably and resiliently engaging and positioning said bowl on said arms by said end projections.

2. A barbecue grill according to claim 1 and wherein said bowl has circumferentially spaced openings formed therethrough for receiving said end projections whereby said projections extend into the interior of said bowl, and a grid within said bowl and resting on said projections.

3. A barbecue grill according to claim 2 and wherein said wire members are pivotally connected to said diverging arms, said wire members comprising outwardly extending arms forming a bow, said projections being inward extensions of said bow, said bow having a resiliency normally urging said end projections into said bowl openings and whereby said end projections may be manually pulled out of said openings for dis-assembling the grill.

4. A barbecue grill according to claim 3 and wherein said bowl has a circular upper lip, said bows extending vertically above said upper lip and said end projections extending horizontally into said bowl.

5. A barbecue grill according to claim 4 and wherein said wire members connected to each arm form two adjacent and parallel bows, said end projections comprising loops disposed at the lower ends and between said parallel bows.

6. A barbecue grill according to claim 5 and wherein said legs comprise central, vertical standards, and hinge members connected to said legs and pivotally inter-securing said legs whereby said legs may be collapsed and nested together when said end projections are pulled out and removed from said bowl openings.

7. A barbecue grill according to claim 6 and wherein said hinge members are U-shaped, the bridge of the U being fixedly connected to one of said legs and the ends of the U rotatably embracing the remaining legs, one of said hinge members connected to the top portion of said standards and another hinge member being connected at the bottom portion of said standards.

8. A barbecue grill according to claim 7 and including an upper inverted bowl resting on said first named bowl, said upper bowl having a lower circular lip engaging said first named bowl upper lip, said lower circular lip engagement being below the top of said domes.

9. A barbecue grill according to claim 8 and wherein said upper bowl is transparent, and openings therein for venting the interior thereof to minimize misting of said upper bowl.

References Cited

UNITED STATES PATENTS 2,787,996    4/1957    Rumsey      126—25
3,286,705    11/1966    Bedol.

JAMES W. WESTHAVER, *Primary Examiner.*

U.S. Cl. X.R.

126—9, 304